UNITED STATES PATENT OFFICE.

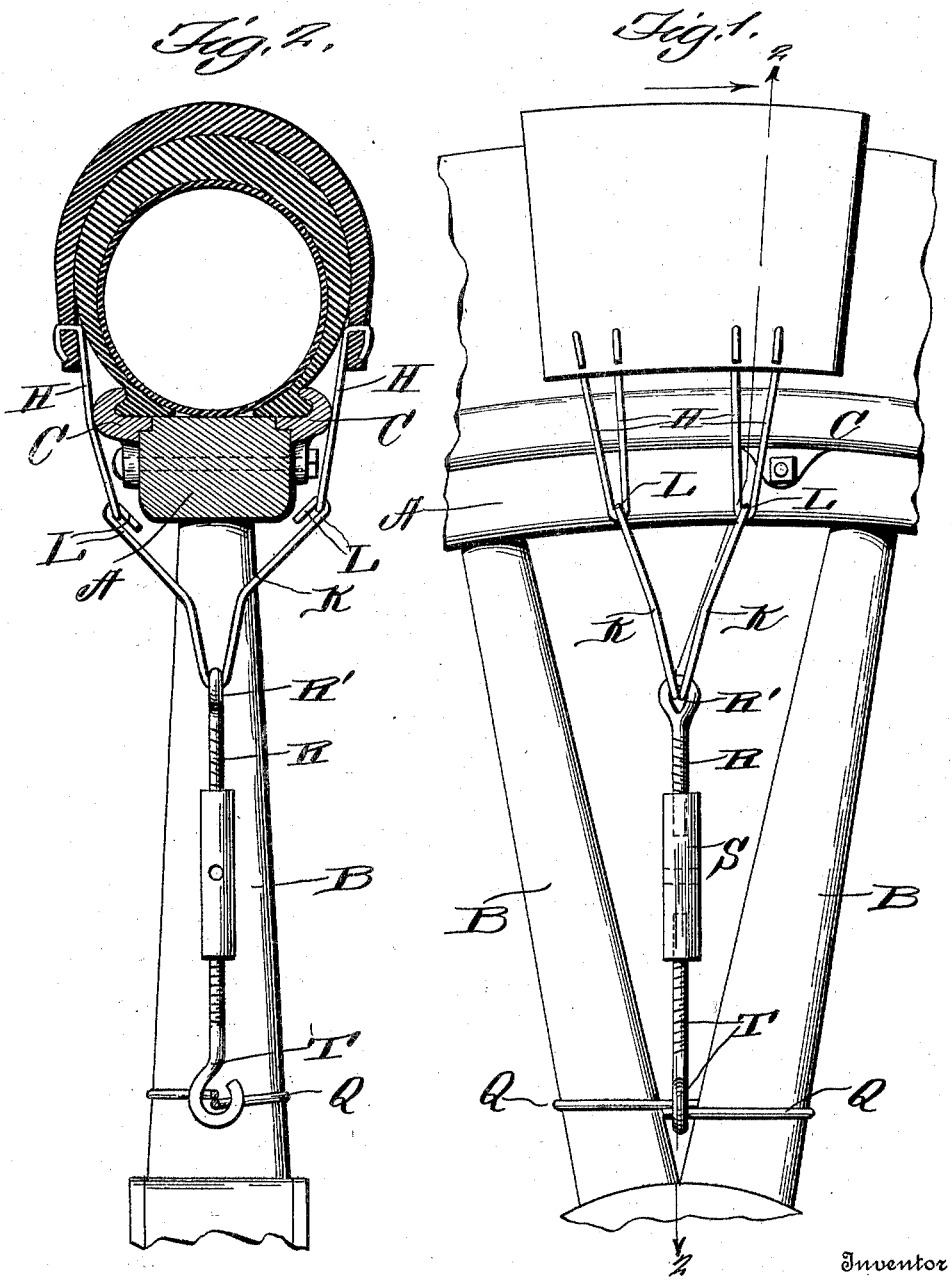

WILLIAM OLIVER HARMON, OF LA PRYOR, TEXAS.

PROTECTING DEVICE FOR TIRES.

1,275,913. Specification of Letters Patent. Patented Aug. 13, 1918.

Application filed March 30, 1918. Serial No. 225,806.

*To all whom it may concern:*

Be it known that I, WILLIAM O. HARMON, a natural-born citizen of the United States, residing at La Pryor, in the county of Zavalla, and State of Texas, have invented certain new and useful Improvements in Protecting Devices for Tires; and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a tire saving device, and consists essentially in the provision of a pad of any suitable material, such as a section of the outer casing of an old pneumatic tire and which is adapted to be held over the tread surface of the tire to be protected.

My invention consists of a simple and efficient device of this nature, having various details of construction, combinations and arrangements of parts which will be hereinafter fully described, shown in the accompanying drawings and then specifically defined in the appended claim.

I illustrate my invention in the accompanying drawings which, with the letters of reference marked thereon, form a part of this specification and in which:

Figure 1 is a side elevation showing the application of my invention to a section of a wheel and rim, and Fig. 2 is a cross sectional view through the same.

Reference now being had to the details of the drawings by letter:

A designates the felly of a wheel, B the spokes and C the tire engaging rim, engaging the pneumatic tire E in the usual manner. A pad or protecting covering, consisting of a section of an old tire or other material and which has staple-shaped members H passing through the same with their ends clenched and forming loops upon opposite sides of the pad. Bail-shaped members K have hooked ends L engaging said loops, and R is a rod having an eye R' at one end engaging said bail-shaped members. The shank portion of the rod R is threaded as is also the shank portion of a hook T, which hood and rod engage the intermediate tubular member S which is interiorally threaded and forms a turn buckle. A wire Q passes about the spokes near their inner ends and at the point of intersection of the wire, the latter is engaged by said hook and forms a secure anchorage therefor. The adjustment of the same is done preferably when the tire is flat. The pad is placed about the tire at the location to be protected, the hooks at the ends of the bail-shaped portion are caught into the loop upon the pad upon the point opposite and the hook with the threaded shank portion is caught under the wire about the spokes adjacent to the hub and by rotating the turn-buckle the pad may be drawn tightly against the tread surface of the tire. These pads may vary in length and there may be one or more as may be desired and fastened securely at different locations where protection to the tread surface is desired.

By the provision of a device embodying the features of my invention, an emergency device is afforded which may be easily and quickly applied to the tire and if the entire tread surface is desired to be protected the pad may extend entirely around the circumference of the wheel.

What I claim to be new is:

A device for protecting tires, comprising in combination with a wheel and pneumatic tire, a pad about the tire, V-shaped wires having hooked ends engaging the marginal edges of the pad, a turn buckle having threaded rods mounted therein, means secured to the spokes of the wheel near their inner ends and to which one of said rods is connected centrally between the spokes and an angle wire connected to the other rod, and having flaring arms bent at their ends into hooks engaging said V-shaped wire.

In testimony whereof I hereunto affix my signature in presence of two witnesses.

WILLIAM OLIVER HARMON.

Witnesses:
 JAMES CHESTER POGUE,
 THOMAS PHILIP HULL.

Copies of this patent may be obtained for five cents each, by addressing the "Commissioner of Patents, Washington, D. C."